United States Patent [19]
Ganley

[11] Patent Number: 6,161,078
[45] Date of Patent: Dec. 12, 2000

[54] EFFICIENT METHOD FOR SOLVING SYSTEMS OF DISCRETE ROTATION AND REFLECTION CONSTRAINTS

[75] Inventor: Joseph L. Ganley, Herndon, Va.

[73] Assignee: Cadence Design Systems, Inc., San Jose, Calif.

[21] Appl. No.: 09/158,119

[22] Filed: Sep. 21, 1998

[51] Int. Cl.$^7$ .................................................. G06F 15/00
[52] U.S. Cl. ......................... 702/150; 702/152; 345/433; 345/440
[58] Field of Search ..................................... 702/150–152, 702/153; 345/433, 440; 716/8–10, 19–21

[56] References Cited

U.S. PATENT DOCUMENTS

| | | | |
|---|---|---|---|
| 4,571,678 | 2/1986 | Chaitin | 364/300 |
| 5,249,295 | 9/1993 | Briggs | 395/650 |
| 5,568,396 | 10/1996 | Bamji et al. | 716/3 |
| 5,581,474 | 12/1996 | Banji et al. | 364/490 |
| 5,663,891 | 9/1997 | Bamji et al. | 716/2 |
| 5,729,466 | 3/1998 | Bamji | 716/10 |
| 5,774,730 | 6/1998 | Aizilkowitz et al. | 395/709 |
| 5,784,066 | 7/1998 | Aizikowitz et al. | 345/440 |

*Primary Examiner*—Marc S. Hoff
*Assistant Examiner*—Hien Vo
*Attorney, Agent, or Firm*—Philip M. Shaw, Jr.; Crosby, Heafey, Roach & May

[57] ABSTRACT

A computer implemented, graph based method for determining the orientation of objects which can assume a plurality of orientations relative to a default orientation, including being rotated 90° clockwise, mirrored about an X axis, or mirrored about a Y axis, where the X axis and the Y axis are orthogonal to each other, and having a plurality of orientation constraints, including a fixed orientation constraint which requires an object to have one of eight predefined orientations, a same orientation constraint which requires that every object in a set of two or more objects must have the same orientation, a mirrored orientation constraint, which requires that a pair of objects have a mirrored orientation about the X axis or the Y axis, and a same or mirrored orientation constraint, which requires that every object in a set of two or more objects must have either the same orientation or the mirrored orientation. Upon recognition of an overconstraint, connecting edges are traced backward, using the parent field, from the vertex for which an overconstraint was recognized to the first vertex found whose color was assigned or, if no such vertex is found, to the vertex for which an overconstraint was recognized, a set of constraints are formed which includes the recognized overconstraint and overconstraints corresponding to the edges which are traced, one of the constraints of the set of constraints is eliminated, and the graphing operation is repeated from the beginning.

7 Claims, 4 Drawing Sheets

FIG. 3E  FIG. 3F

# EFFICIENT METHOD FOR SOLVING SYSTEMS OF DISCRETE ROTATION AND REFLECTION CONSTRAINTS

BACKGROUND OF THE INVENTION

1. Field of the Invention

This invention relates to electronically determining an orientation for each of a number of objects, more particularly for solving systems of discrete rotation and reflection constraints in determining the orientations of the objects.

2. Related Art

Many applications, such as the physical design of electronic integrated circuits, involve choosing an orientation for each of a number of objects in two dimensions. The orientation of an object can be described by a finite series of clockwise rotations and/or reflections about the X axis or Y axis.

Figure 1:
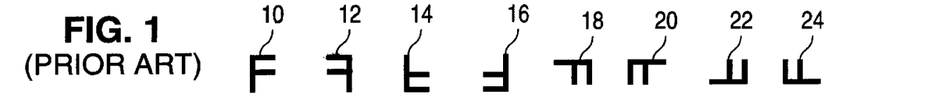
FIG. 1 is an illustration of eight possible orientations of an object.

For clarity of exposition, focus on the rectilinear model, in which only horizontal and vertical lines are allowed, since most integrated circuits are fabricated under this model. In the rectilinear model, there are eight (8) possible orientations of an object, as shown in FIG. 1. It is often desirable to place constraints on the orientation of an object, or on the relative orientation of sets of two or more objects. In particular, the following types of constraints are defined:

- A single object has a fixed orientation set to one of the eight orientations.
- Every object in a set of two or more must have the same orientation.
- A pair of objects must have a mirrored orientation about the X axis or the Y axis.
- Every object in a set of two or more must have either same or mirrored orientation, and if mirrored, must be mirrored about either the X axis or the Y axis.

A problem which must be solved is as follows: given a set of objects and a set of constraints on these objects, where each constraint is one of the four described above, choose an orientation for each object such that all the constraints are satisfied. A solution to this problem can be easily generalized to other types of orientation constraints and other sets of possible orientations.

For some sets of constraints, it may not be possible to satisfy all the constraints. An overconstraint is a set of constraints that cannot all be satisfied simultaneously. For example, one simple overconstraint would be if there were both a same orientation and a mirrored orientation constraint on the same pair of objects A and B. Clearly B cannot have both the same orientation as A and a mirrored orientation from A. Thus, this pair of constraints forms an overconstraint.

Overconstraints are handled by choosing one of the constraints involved and relaxing it—i.e., turning it off. The exact selection of which constraint in an overconstraint to relax should be made by a procedure separate from the algorithm, in some application-specific way; i.e., the user may have a predetermined preference as to how the choice is made about which constraint to relax.

A known algorithm (the "iterative algorithm") currently employed to solve this problem begins by setting the orientations of objects on which there are fixed orientation constraints. It then iteratively sets the orientations of objects that share constraints with objects whose orientations have already been set. More precisely, and referring to FIGS. 2A and 2B, after starting at step 26, begin by setting each object's orientation to undefined (step 28). Now set the orientations of the objects on which there are fixed orientation constraints (step 30). Then, repeat the following: find a constraint (step 32) that contains some objects whose orientations have already been set and set the orientations of the other objects in the constraint appropriately (step 42). For same or mirrored orientation constraints (step 34), arbitrarily choose the same orientation (step 38) if either is acceptable (step 36), otherwise choose the only acceptable orientation (step 40).

Figure 2A:
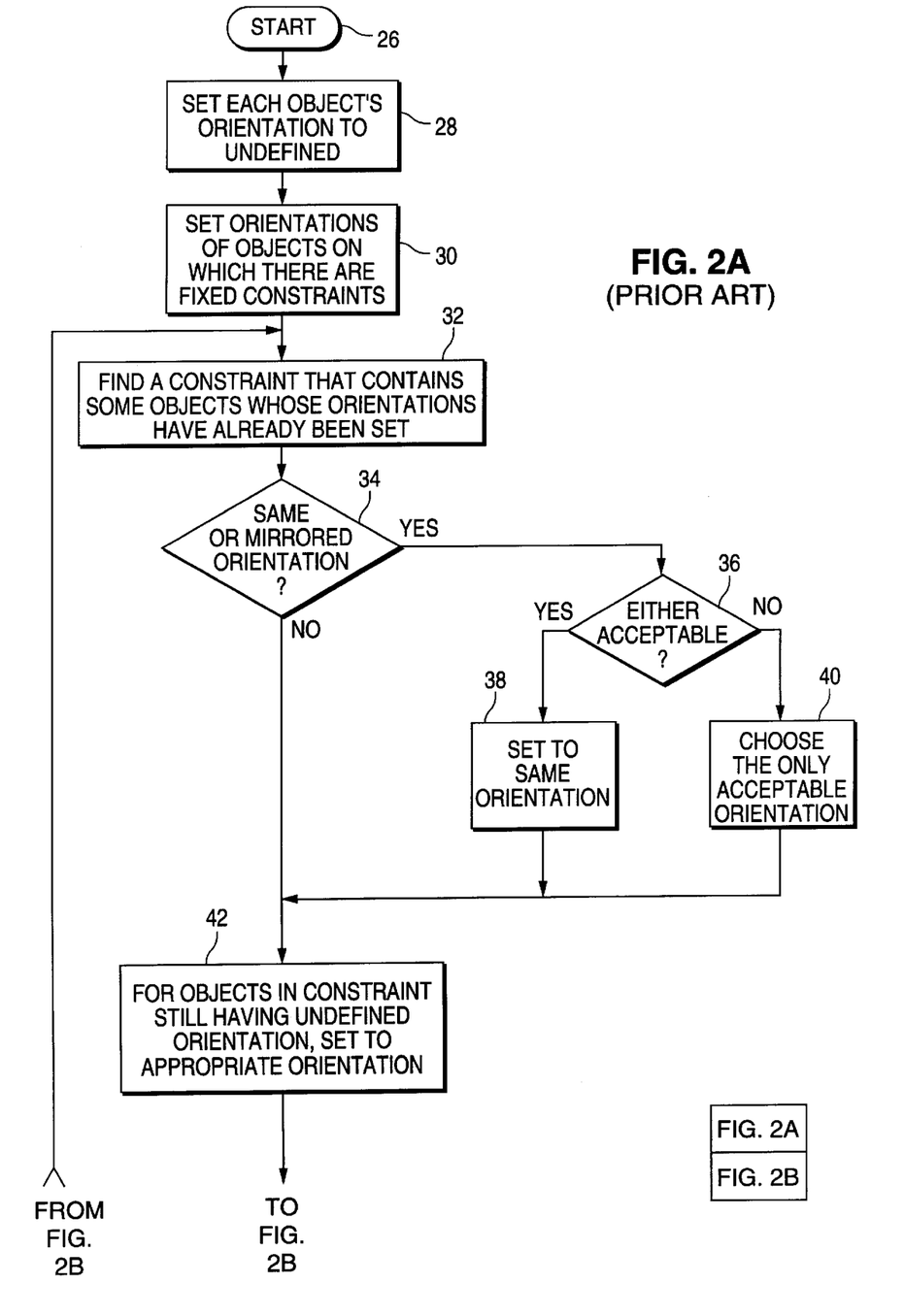
FIGS. 2A, 2B are, together, a flow chart illustrating a prior art iterative algorithm for solving object orientation constraints.
Figure 2B:
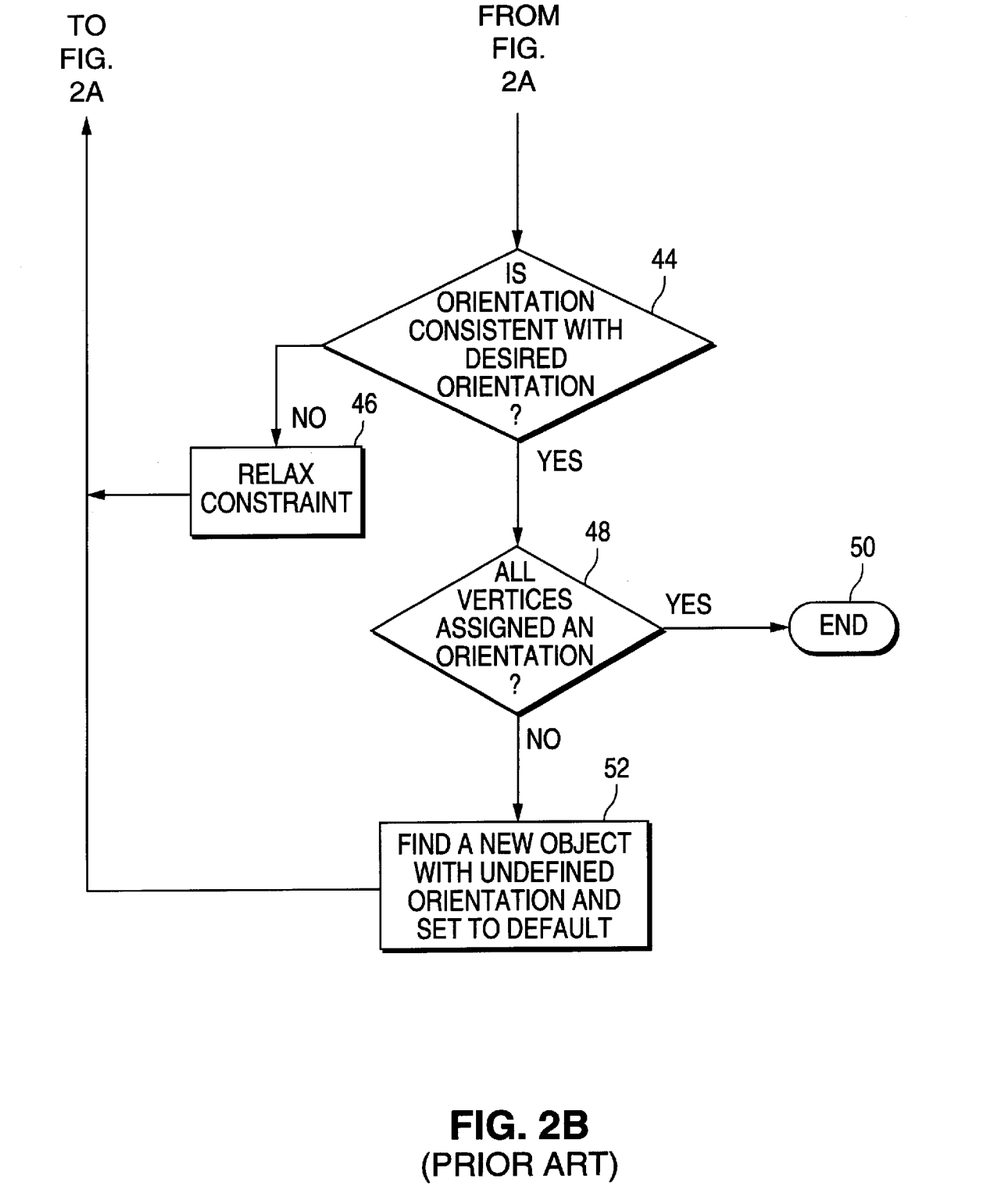

Check (step 44) whether the orientations are consistent with the desired orientations. If all vertices have been assigned an orientation (step 48), end the process (step 50). When an iteration passes in which no orientations are updated, then find (step 52) a new object with an undefined orientation, set it to a default orientation, and return to step 32. If it is necessary to set the orientation of an object to a different orientation than one to which it is already set (step 44), then this is an overconstraint, and the current constraint is relaxed (step 46). The process returns to step 32.

Unfortunately, there are situations where the arbitrary way that same or mirrored orientation constraints are enforced can lead to the algorithm finding no solution even though one exists. For example, consider four objects A, B, C, and D. Objects A and D have a fixed orientation set to that shown as (a) in FIG. 1. Objects A and B have a same or mirrored orientation constraint about the Y axis, as do objects C and D. Objects B and C have a mirrored orientation constraint about the Y axis. The iterative algorithm first sets the orientations of A and D to (a). But then, regardless of whether it chooses to enforce the same or mirrored orientation constraints as same or mirrored, it will set the orientations of B and C to be the same, and the mirrored orientation constraint between them will not be satisfied.

The iterative algorithm has a time complexity $O((n+m)^2)$. where n is the number of objects and m is the number of constraints.

SUMMARY OF THE INVENTION

The above described problems in determining orientations of objects are overcome by the present invention of a computer implemented, graph based method according to a first embodiment of the invention. This computer implemented, graph based method determines the orientation of objects which can assume a plurality of orientations relative to a default orientation, including being rotated 90° clockwise, mirrored about an X axis, or mirrored about a Y axis, where the X axis and the Y axis are orthogonal to each other, and having a plurality of orientation constraints, including a fixed orientation constraint which requires an object to have one of eight predefined orientations, a same orientation constraint which requires that every object in a set of two or more objects must have the same orientation, a mirrored orientation constraint, which requires that a pair of objects have a mirrored orientation about the X axis or the Y axis, and a same or mirrored orientation constraint, which requires that every object in a set of two or more objects must have either the same orientation or the mirrored orientation, comprises the steps (a) through (f) now to be described. In step (a) R, X and Y interference graphs are constructed, corresponding to a 90° clockwise rotation operation, a mirror about the X axis operation, or a mirror about the Y axis operation, respectively, each of the R, X and Y interference graphs having a plurality of vertices and a plurality of edges. Each object corresponds to one of the vertices in each of the R, X and Y interference graphs and each edge corresponds to a constraint between the objects represented by the vertices connected by the edge. Two of the vertices are considered neighbors if connected by an edge. No neighbor vertices are allowed to have the same color.

In a step (b), an intermediate vertex is placed between each pair of vertices in each of the R, X and Y graphs which represent a pair of objects having a same constraint limitation. Each intermediate vertex is connected by an edge with each vertex of the pair of vertices. In a step (c), an edge is placed between each pair of vertices in one of the X graph or the Y graph which represent a pair of objects having a mirror constraint about either the X axis or the Y axis, respectively.

Step (d) is a vertex coloring operation wherein each vertex of each pair of objects having a fixed orientation constraint is set to either a first color indicative that no operation is to be performed or a second color indicative that a respective one of the 90° clockwise rotation operation, the mirror about the X axis operation, or the mirror about the Y axis operation is to be performed, as may be required to implement the fixed orientation constraint relative to a default orientation. If there are no vertices for objects having a fixed orientation, then an arbitrary vertex is colored as either the first color or the second color.

In a step (e), beginning from a vertex colored in step (d), all of the remaining vertices are colored with either the first color or the second color subject to the condition that no neighbor vertices are to have the same color. In a last step (f), for each colored vertex in the graphs R, X, and Y, a 90° clockwise rotation operation, a mirror about the X axis operation, and a mirror about the Y axis operation, respectively, is not performed or is performed on the object corresponding to that colored vertex, depending upon whether that vertex is the first color or the second color, respectively. For reasons to be explained in greater detail further in this specification, the use of such a coloring algorithm guarantees a valid solution and is faster than the prior art iterative algorithm.

In the preferred embodiment, in steps (d) and (e), a parent field is added to each vertex which contains the immediately previous vertex that was colored. After performing step (e), the further steps (e)(i)–(e)(v) are performed. In a step (e)(i), an overconstraint is recognized when, in any of the steps of coloring a vertex, there is an attempt to color neighbor vertices with the same color. Upon recognition of an overconstraint, the connecting edges, in a step (e)(ii), are traced backward using the parent field from the vertex for which an overconstraint was recognized to the first vertex found whose color was assigned in step (d) or, if no such vertex is found, to the vertex for which an overconstraint was recognized. In a step (e)(iii), a set of constraints are formed which includes the recognized overconstraint and overconstraints corresponding to the edges which are traced. One of the constraints of the set of constraints is eliminated in at step (e)(iv). The graphing operation is repeated from the beginning in a step (e)(v). For reasons to be explained in greater detail further in this specification, this feature of the invention allows the coloring algorithm to deal better with overconstraints.

According to another embodiment of the invention, a computer automated design system for designing structures having objects which can assume a plurality of orientations relative to a default orientation, including being rotated 90° clockwise, mirrored about an X axis, or mirrored about a Y axis, where the X axis and the Y axis are orthogonal to each other, and having a plurality of orientation constraints, including a fixed orientation constraint which requires an object to have one of eight predefined orientations, a same orientation constraint which requires that every object in a set of two or more objects must have the same orientation, a mirrored orientation constraint, which requires that a pair of objects have a mirrored orientation about the X axis or the Y axis, and a same or mirrored orientation constraint, which requires that every object in a set of two or more objects must have either the same orientation or the mirrored orientation, utilizes a computer implemented graph based method for determining an orientation for each of the plurality of objects. The graph based method comprises the first steps (a) of creating three separate constraint graphs R, X and Y, representing a 90° clockwise rotation operation, a mirror about the X axis operation, and a mirror about the Y axis operation, respectively. Each graph consists of a collection of vertices, each vertex representing an object, and a collection of edges, each edge representing a constraint, where each edge is defined by separate vertices at its endpoints which are to be considered neighbors. In a step (b), in each of the R, X and Y graphs, intermediate vertices are introduced between all pairs of vertices of objects subject to a constraint. Edges are added between intermediate vertices and each vertex of the pairs of vertices of objects subject to a constraint. Exceptions to step (b) are that (i) in the X graph or the Y graph corresponding to an axis about which there is a mirrored constraint, between vertices of pairs of objects subject to the mirrored constraint no intermediate vertices are introduced and an edge is added, (ii) in the X graph or the Y graph corresponding to an axis about which there is a same or mirrored constraint, between vertices of pairs of objects subject to the same or mirrored constraint no intermediate vertices and no edges are introduced.

After step (b), each vertex of each pair of objects having a fixed orientation constraint is set in a step (c) to either a first color indicative that no operation is to be performed or a second color indicative that a respective one of the 90° clockwise rotation operation, the mirror about the X axis operation, or the mirror about the Y axis operation is to be performed, as may be required to implement the fixed orientation constraint relative to a default orientation. If there are no vertices for objects having a fixed orientation, then an arbitrary vertex is colored as either the first color or the second color.

In a step (d), beginning from a vertex colored in step (c), all of the remaining vertices are sequentially colored with either the first color or the second color subject to the condition that no neighbor vertices are to have the same color. In a step (e), for each colored vertex in the graphs R, X, and Y, a 90° clockwise rotation operation, a mirror about the X axis operation, and a mirror about the Y axis operation, respectively, is not performed or is performed on the object corresponding to that colored vertex, depending upon whether that vertex is the first color or the second color, respectively.

In a modification of the second embodiment, after performing step (d), the further steps are performed of (d)(i) recognizing an overconstraint when, in any of the steps of coloring a vertex, there is an attempt to color neighbor vertices with the same color, (d)(ii) upon recognition of an overconstraint, tracing connecting edges backward, using the parent field, from the vertex for which an overconstraint was recognized to the first vertex found whose color was assigned due to a fixed orientation constraint or, if no such vertex is found, to the vertex for which an overconstraint was recognized, (d)(iii) forming a set of constraints which includes the recognized overconstraint and overconstraints corresponding to the edges which are traced, (d) (iv) eliminating one of the constraints of the set of constraints, and (d)(v) repeating the graphing operation from the beginning.

In still a third embodiment of the invention, a computer automated design system for designing structures having objects which can assume a plurality of orientations relative to a default orientation, including being rotated 90° clockwise, mirrored about an X axis, or mirrored about a Y axis, where the X axis and the Y axis are orthogonal to each other, and having a plurality of orientation constraints, including a fixed orientation constraint which requires an object to have one of eight predefined orientations, a same orientation constraint which requires that every object in a set of two or more objects must have the same orientation, a mirrored orientation constraint, which requires that a pair of objects have a mirrored orientation about the X axis or the Y axis, and a same or mirrored orientation constraint, which requires that every object in a set of two or more objects must have either the same orientation or the mirrored orientation, a computer implemented graph based method is used for determining an orientation for each of the plurality of objects.

This method of the third embodiment comprises the steps of (a) creating three separate constraint graphs R, X and Y, representing a 90° clockwise rotation operation, a mirror about the X axis operation, and a mirror about the Y axis operation, respectively, each graph to consist of a collection of vertices, each vertex representing an object, and a collection of edges, each edge representing a constraint, where each edge is defined by separate vertices at its endpoints which are to be considered neighbors and with no neighbor vertices to have the same color and (b) initially creating the graphs R, X and Y with no edges and leaving each vertex uncolored.

Thereafter in a step (b)(i) each vertex of each object which is to have a fixed orientation constraint is set to either a first color indicative that no operation is to be performed or a second color indicative that a respective one of the 90° clockwise rotation operation, the mirror about the X axis operation, or the mirror about the Y axis operation is to be performed, as may be required to implement the fixed orientation constraint relative to a default orientation and, if there are no vertices for objects having a fixed orientation, then coloring an arbitrary vertex as either the first color or the second color. In a step (b) (ii), after performing step (b) (i), a same orientation constraint is implemented pairwise to every pair of objects in the constraint by adding intermediate vertices $p_R$, $p_X$, and $p_Y$ between each two vertices $u_R$, $v_R$, $u_X$, $v_X$, and $u_Y$, $v_Y$, respectively, of a given pair of objects in each of the R, X and Y graphs, respectively, for which there is a same orientation constraint and edges ($u_R$, $v_R$), ($u_X$, $v_X$) and ($u_Y$, $v_Y$) to the R, X and Y graphs, respectively, thereby forcing the vertices $u_R$ and $v_R$ to be the same color, $u_X$ and $v_X$ to be the same color, and $u_Y$ and $v_Y$ to be the same color.

In a step (b)(iii) of the third embodiment, after performing either step (b)(i) or step (b)(ii), a mirrored orientation constraint is implemented by adding intermediate vertices $p_R$, $p_X$, $p_Y$ between each two vertices $u_R$, $v_R$; $u_X$, $v_X$; and $u_Y$, $v_Y$ for objects which do not have a mirrored constraint without introducing intermediate vertices between vertices for objects which have a mirrored constraint and edges are added between each intermediate vertex $p_R$, $p_X$, $p_Y$ and the vertices $u_R$, $v_R$; $u_X$, $v_X$; $u_Y$, $v_Y$, respectively, between which each vertex $p_R$, $p_X$ and $p_Y$ is intermediate. All of the remaining vertices are then colored such that no neighbor vertices have the same color. In a step (b)(iv), after performing step (b)(i), a same or mirrored orientation constraint about a selected one of the X axis or the Y axis with respect to every pair of objects in the constraint is implemented by adding intermediate vertices $p_R$ between each two vertices $u_R$, $v_R$ for objects in the R graph and $p_X$, $p_Y$ between $u_X$, $v_X$ and $u_Y$, $v_Y$, respectively, in whichever of the X graph or the Y graph corresponds to the non-selected one of the X axis or the Y axis, i.e. the axis which does not have the constraint about it. Edges are added between each intermediate vertex $p_R$, $p_X$, $p_Y$ and the vertices $u_R$, $v_R$; $u_X$, $v_X$; $u_Y$, $v_Y$, and $u_Y$, $v_Y$, respectively, between which each vertex $p_R$, $p_X$ and $p_Y$ is intermediate. No intermediate vertices and edges are introduced between vertices for objects in the X graph or the Y graph corresponding to the selected one of the X axis or the Y axis. All of the remaining vertices are colored such that no neighbor vertices have the same color.

In a step (c) of the third embodiment, for each colored vertex $u_R$, $v_R$, $u_X$, $v_X$, and $u_Y$, $v_Y$ in the graphs R, X, and Y, respectively, a 90° clockwise rotation operation, a mirror about the X axis operation, and a mirror about the Y axis operation, respectively, is not performed or is performed on the object corresponding to that colored vertex, depending upon whether that vertex is the first color or the second color, respectively. In a preferred version of the third embodiment, after performing steps (b)(i)–(iv), the additional steps are performed of (b)(v) recognizing an overconstraint when, in any of the steps of coloring a vertex, there is an attempt to color neighbor vertices with the same color, (b)(vi) upon recognition of an overconstraint, tracing connecting edges backward, using the parent field, from the vertex for which an overconstraint was recognized to the first vertex found whose color was assigned due to a fixed orientation constraint or, if no such vertex is found, to the vertex for which an overconstraint was recognized, (b)(vii) forming a set of constraints which includes the recognized overconstraint and overconstraints corresponding to the edges which are traced, (b) (viii) eliminating one of the constraints of the set of constraints, and (b)(ix) repeating the graphing operation from the beginning.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 3A, 3B, 3C and 3D are depictions of R, X and Y interference color graphs according to the coloring algorithm method of the present invention for solving object orientation constraints, of which

DETAILED DESCRIPTION OF THE PREFERRED EMBODIMENT

The new algorithm now to be described, and that is the subject of this application, will be called the "coloring algorithm" in this application.

A user of the present invention is given a set of objects and a set of constraints on the orientations of these objects, where each constraint is of one of the four types described above. The orientation of an object in the rectilinear model can be represented by the application or non-application of these operations:

Rotate the object 90 degrees clockwise (R90).
Mirror the object about the X axis (MX).
Mirror the object about the Y axis (MY).

It is to be understood that these operations are performed digitally in a computer aided design apparatus by manipulation of digital data. If two or more of these operations are applied, then they must be applied in this order; i.e., R90 is applied before MX or MY, and MX is applied before MY. These operations, if applied, start from a default orientation which is shown as orientation (a) in FIG. 1. Thus, each of the eight possible orientations can be precisely and uniquely described by choosing whether or not to apply each of these operations. Table I shows, for each of the orientations shown in FIG. 1, which of these operations are applied to produce that orientation.

TABLE 1

Operations applied to produce each orientation

| Orientation | Apply R90? | Apply MX? | ApplyMY? |
|---|---|---|---|
| (a) | No | No | No |
| (b) | No | No | Yes |
| (c) | No | Yes | No |
| (d) | No | Yes | Yes |
| (e) | Yes | No | No |
| (f) | Yes | No | Yes |
| (g) | Yes | Yes | No |
| (h) | Yes | Yes | Yes |

Now construct three graphs denoted R, X and Y, corresponding to a 90° clockwise rotation operation, a mirror about the X axis operation, or a mirror about the Y axis operation, respectively. In terms of semantics, a graph G=(V, F) consists of a collection V of vertices and a collection E of edges, where each edge has two vertices u and v as endpoints. Such an edge is denoted (u, v). Edges are undirected, so (u, v) and (v, u) denote the same edge between vertices u and v. If edge (u, v) is in E, then it is said that u and v are adjacent or neighbors. The graphs will be colored using two colors: red and green. A coloring is valid if, for each edge (u, v), vertices u and v have different colors. Note that this implies that if two vertices $u_1$ and $u_2$ are neighbors of a vertex v, i.e. $(u_1, v)$ and $(u_2, v)$ are both edges in E, then $u_1$ and $u_2$ must have the same color.

Referring now more particularly to FIGS. 3A, 3B, 3C and 4, begin (step 60) by digitally constructing in a computer aided design apparatus the three graphs R, X, and Y (step 62). In each graph, there is initially a vertex for each object, and there are initially no edges. For a given object, the corresponding vertices in R, X, and Y are $u_R$, $u_X$, and $u_Y$, respectively (if there is no danger of confusion, then these three vertices are collectively referred to as u). As mentioned above, you are going to color these three graphs using two colors, red and green, such that neighbor vertices have different colors. If a vertex $u_R$ in graph R is green, then the R90 operation is to be applied to the corresponding object; if $u_R$ is red, then the R90 operation is not to be applied. Similarly, the colors of the vertices in X and Y indicate whether the MX and MY operations, respectively, are to be applied to the object corresponding to each vertex.

Figure 3A:
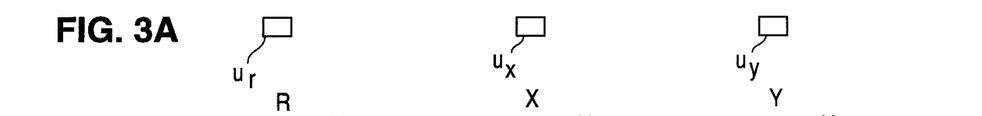
FIG. 3A shows a fixed orientation constraint in color graphs R, X and Y.
Figure 3B:
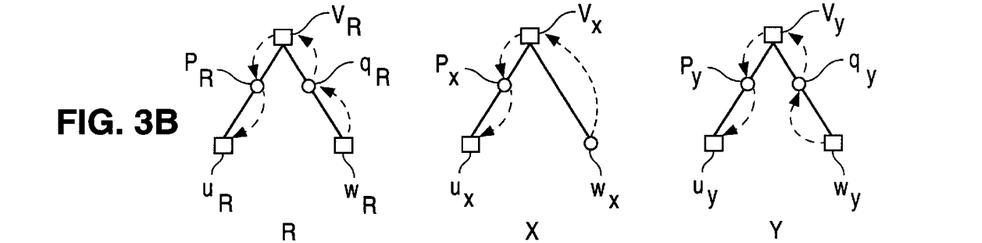
FIG. 3B shows a same orientation constraint in color graphs R and Y and a mirror orientation constraint graph X.
Figure 3C:
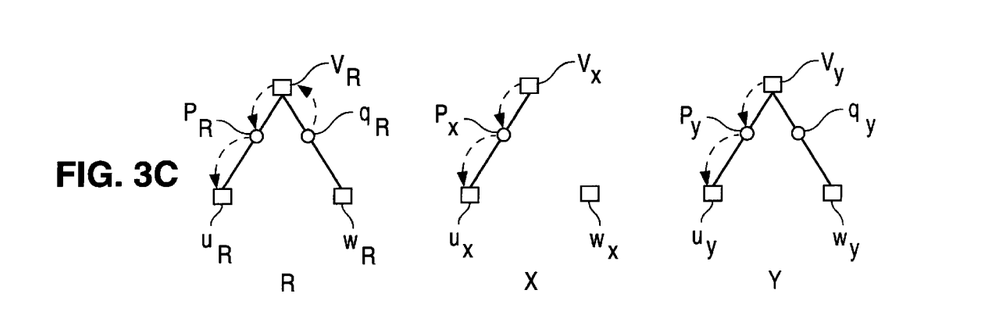
FIG. 3C shows a same orientation constraint in graphs R and Y and a same or mirror orientation constraint in graph X.
Figure 3D:
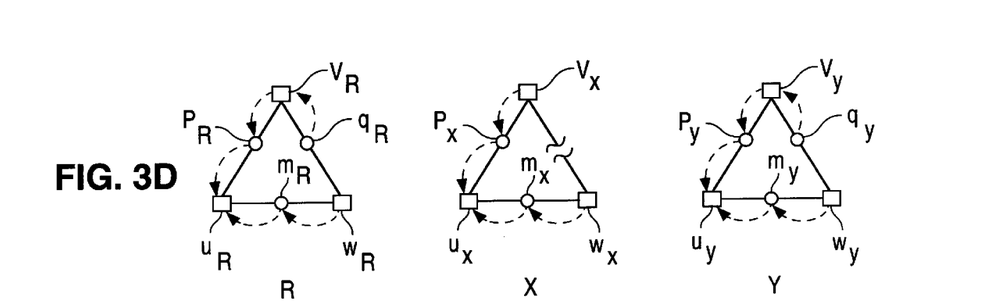
FIG. 3D shows a same orientation constraint in graphs R and Y and an overconstraint in graph X.
Figure 3E:
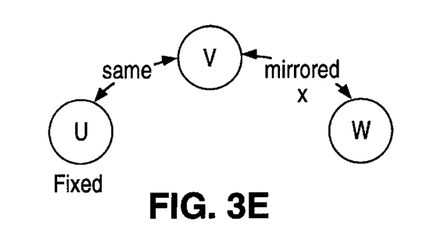
FIGS. 3E and 3F depict constraints between objects U, V and W.
Figure 3F:
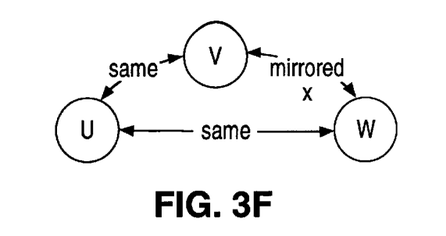
Figure 4:
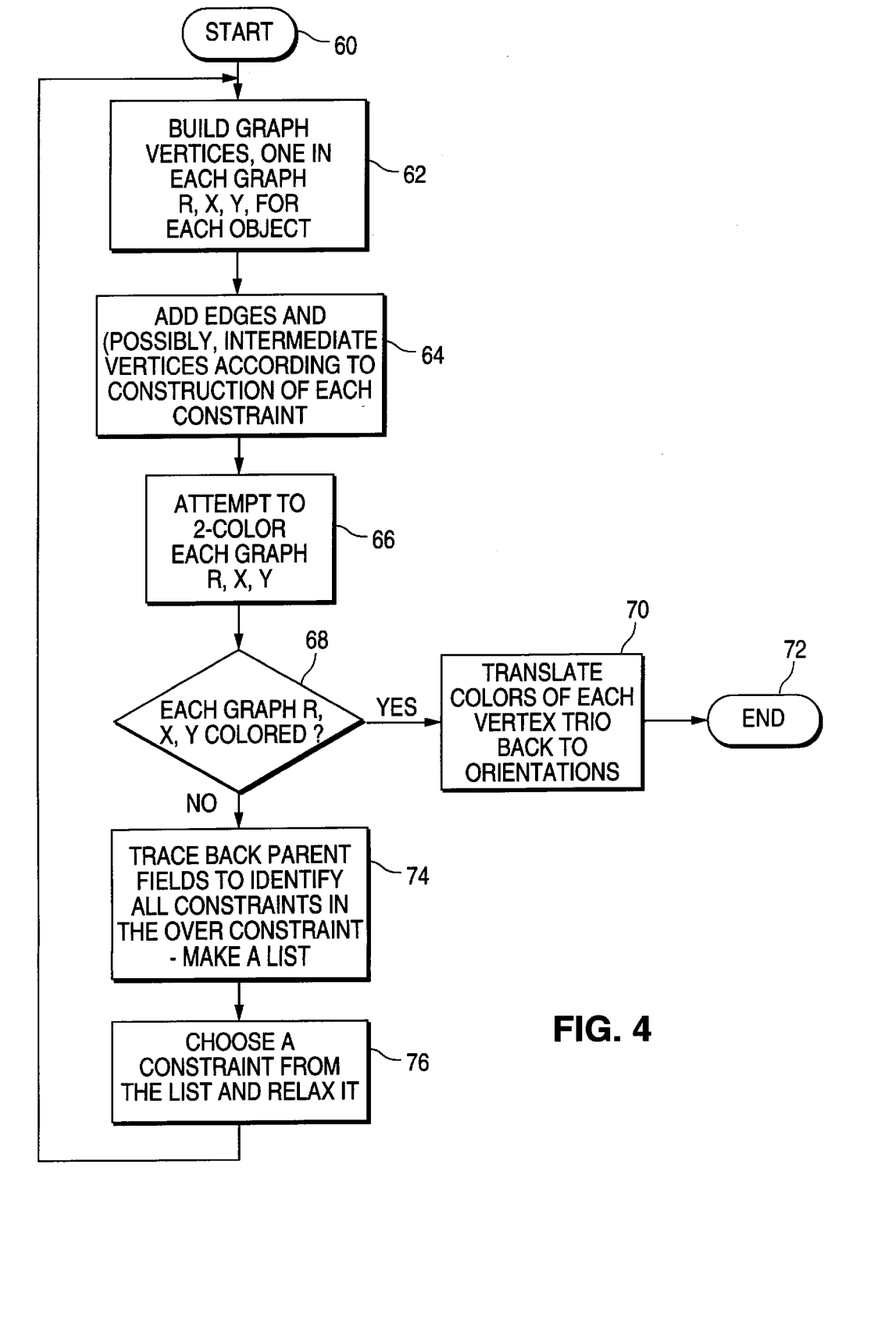
FIG. 4 is a flow chart illustrating a coloring algorithm according to the present invention for solving object orientation constraints.

The various exemplary constraints between objects U, V and W are depicted in FIG. 3F. It is to be understood that these constraints would be stored in a memory of the computer aided design apparatus. Initially, the color of every vertex is undefined. A fixed orientation constraint is implemented for the object corresponding to vertex u by setting the colors of vertices $u_R$, $u_X$ and $u_Y$ to the appropriate values to implement the orientation as prescribed in Table I. In FIG. 3A vertices $u_R$, $u_X$ and $u_Y$ have been set to red, as denoted by a □.

Referring to FIG. 3B, a same orientation constraint is implemented as follows, if the constraint involves more than two objects, then this operation is applied pairwise to every pair of objects (three are shown) in the constraint. Let u and v be the vertices corresponding to the first pair of objects and v and w be the vertices corresponding to the second pair of objects which are subject to the same orientation constraint. Intermediate vertices $p_R$, $p_X$, and $p_Y$ are added to the R, X, and Y graphs, respectively, between the vertices $u_R$, $v_R$; $u_X$, $v_X$ and $u_Y$, $v_Y$, respectively. In step 64, edges $(u_R, p_R)$ and $(p_R, v_R)$ are added to R, edges $(u_X, p_X)$ and $(p_X, v_X)$ are added to X, and edges $(u_Y, p_Y)$ and $(p_Y, v_Y)$ are added to Y. In this way, $u_R$ and $v_R$ are forced to be colored the same color, as are $u_X$ and $v_X$ as well as $u_Y$ and $v_Y$. This is because neighbor vertices of intermediate vertices must have a color opposite to the intermediate vertices and, in a two color system, this means that the colors must be the same.

A mirrored orientation constraint is implemented as follows. Assume without loss of generality that the constraint is with respect to the X axis. A mirrored orientation constraint must include exactly two objects. Referring again to FIG. 3B, let v and w be the vertices corresponding to these two objects. Intermediate vertices $q_R$ and $q_Y$ are added to R and Y, respectively. Edges $(v_R, q_R)$ and $(q_R, w_R)$ are added to R, and edges $(v_Y, q_Y)$ and $(q_Y, w_Y)$ are added to Y. A single edge $(v_X, w_X)$ without an intermediate vertex is added to X. In this way, $v_R$ and $w_R$ are forced to have the same color, as are $v_Y$ and $w_Y$. The vertices $v_X$ and $w_X$ are forced to have different colors. Inspection of FIG. 3B and Table I shows that this forces the objects corresponding to v and w to have a mirrored orientation about the X axis.

The implementation of a mirrored orientation constraint with respect to the Y axis is similar, but with X and Y reversed throughout. That is, add intermediate vertex $q_R$ and edges $(v_R, q_R)$ and $(q_R, w_R)$ to R, add intermediate vertex $q_X$ and edges $(v_X, q_X)$ and $(q_X, w_X)$ to X, and add edge $(v_Y, w_Y)$ to Y.

The final constraint is a same or mirrored orientation constraint. Again, assume without loss of generality that the constraint is about the X axis. This type of constraint can include more than two objects. Referring to FIG. 3C, as with the same orientation constraint, the following operation is applied pairwise to each pair of objects in the constraint. For each such pair, let v and w be the corresponding pair of vertices. The steps previously described with respect to FIG. 3B are repeated, except for the following changes. Again add intermediate vertex $q_R$ and edges $(v_R, q_R)$ and $(q_R, w_R)$ to R and add intermediate vertex $q_Y$ and edges $(v_Y, q_Y)$ and $(q_Y, w_Y)$ to Y. Further, intermediate vertices $m_R$ and $m_Y$ are added between vertices $u_R$, $w_R$ and $u_Y$, $w_Y$, in the R and Y graphs, respectively. Also edges $(w_R, m_R)$, $(m_R, u_R)$; $(w_X, m_X)$, $(m_X, u_X)$; and $(m_Y, w_Y)$, $(m_Y, u_Y)$ are added to the R, X, and Y graphs, respectively. No edge is added between $v_X$ and $w_X$. In this way, vertices $u_R$, $v_R$ and $w_R$ must have the same color, as must vertices $u_Y$, $v_Y$ and $w_Y$. Vertices $v_X$ and $w_X$ may have either the same color, in which case the objects corresponding to v and w will have the same orientation, or they may have different colors, in which case the objects V and W corresponding to v and w, respectively, will have a mirrored orientation about the X axis. Again, a same or mirrored orientation constraint about the Y axis is similar, but with X and Y reversed throughout.

It has been now shown how to construct graphs R, X, and Y such that a valid 2-coloring of each translates to an orientation for each object such that all constraints are satisfied. What remains to be shown is how to compute such a coloring, and how to deal with overconstraints (sets of constraints that cannot all be simultaneously satisfied).

In the absence of overconstraints, a 2-coloring of each graph can be easily computed in time linear in the number of vertices and edges in the graph. One way to do so is by using a 5 depth-first search. See Cormen, Leiserson, and Rivest, *Introduction to Algorithms*, McGraw Hill, New York, N.Y., 1990, pp. 377–485, for a description of depth-first search. Also see D. Kozen, *The Design and Analysis of Algorithms*, Springer-Verlag, 1992, p. 119, for an explanation of 2-coloring using depth-first search. First, choose a vertex u whose color has already been set due to a fixed orientation constraint. If no such vertex exists, then choose an arbitrary vertex, e.g. p, and assign it the color green. There are at least two valid solutions with opposite colors, so the choice of color for the arbitrary starting vertex is irrelevant. Add a field parent(v) to each vertex v (shown as a dashed line in the figures). The contents of this field will be the vertex that was visited before v. For example, the parent ($v_R$) in FIG. 3B would be the vertex $p_R$. Now, apply the following procedure (step 66) starting from vertex u (or the arbitrary vertex):

Color(u):
(1) For each neighbor vertex of u, e.g. p, that has not already been colored:
   (A) Assign vertex p the opposite color from u;
   (B) Set parent(p) to u;
   (C) Color(p).

Referring to FIG. 3B, $u_R$ has a fixed orientation constraint and is colored red (indicated by □). Vertex $p_R$ is colored by assigning it the opposite color from $u_R$, i.e. vertex $p_R$ is assigned the color green. Parent ($p_R$) is set to $u_R$. Then vertex $p_R$ is colored green. The process proceeds to the next vertex $v_R$ and is repeated. That is, $v_R$ is assigned a color (red) opposite to the color of vertex $p_R$, parent ($v_R$) is set to $p_R$, and $v_R$ is then colored red. This process is repeated for each of the vertices in each of the graphs R, X and Y. Note that the coloring operation may proceed simultaneously in more than one direction. See, for example FIG. 3D where vertex $u_R$ is initially colored red. Then $p_R$ and $m_R$ are each colored green and their parent fields parent ($p_R$) and parent ($m_R$) are each set to $u_R$, and so forth. In the absence of overconstraints, when this procedure completes it will have produced a valid 2-coloring of the graph. If an attempt has to be made to color neighbor vertices with the same color, an overconstraint exists (step 68).

FIG. 3G represents an overconstraint situation. Objects V and W are to have a mirror constraint about the X axis, but objects V and W are to have a same orientation constraint with object U. An overconstraint can be recognized if, in Step (1) above, a neighbor vertex w of vertex v has already been assigned the same color as v, e.g. referring to the X graph in FIG. 3D, vertex $w_X$ has already been assigned a color red. In this case, the edges corresponding to the constraints in the overconstraint either form a cycle or else they form a path whose endpoints are vertices whose colors were assigned due to fixed orientation constraints. Using the parent field, you trace backward (step 74) from $v_X$ until you either encounter $w_X$ again or encounter a vertex whose color was assigned due to a fixed orientation constraint (i.e. $u_X$). One of these two things must happen, since if you do not encounter a vertex whose color was assigned due to a fixed orientation constraint, then you must find a cycle starting and ending at $w_X$, or else parent ($v_X$) would be equal to $w_X$. Having found the overconstraint, you form a set of constraints corresponding to the edges you have just traced, plus the edge ($w_X$, $v_X$). You pass this set of constraints to a procedure (step 76) that relaxes (i.e. turns off) one of the constraints, and then you start all over, build the graphs R, X, and Y, and attempt to 2-color them again. This procedure will be repeated once for each overconstraint, until all overconstraints have been resolved and you produce a valid 2-coloring of the graphs. The criteria used by the procedure to decide which constraint to relax is independent of the algorithm; i.e., the algorithm works correctly regardless of which constraint the procedure chooses to relax. Step 76 may be completely arbitrary or may be a priority algorithm, with certain constraints being more important to maintain than others, for example.

Once a valid 2-coloring has been computed, it is simple to translate (step 70) the three colors of each vertex back into an orientation for the corresponding object, using the translations given in Table 1. For example, the graphs R, X and Y in FIG. 3B would dictate that no operations are performed on objects U and V(all of their vertices are red) but object W undergoes a mirror about the X axis operation (MX) because its vertex $w_X$ is green.

When this is done, each object will have been assigned an orientation such that all constraints that were not relaxed due to overconstraints are satisfied. Each coloring attempt requires O(n+m) time, where n is the number of objects and m is the number of constraints (which is within a constant multiple of the number of edges in the graphs). At this point (step 72), the coloring algorithm is ended. This process, as well as the procedure that decides which constraint in an overconstraint to relax, is repeated once each time an overconstraint is found. Thus, if there are c overconstraints and f(n, m) is the time required by the overconstraint resolution procedure, then the total time required is O(c(n+m+f(n, m))). A typical overconstraint resolution procedure requires at most O(n+m) time itself, which makes the total time required equal to Q(c(n+m)).

In the actual implementation, there is no need to construct three separate graphs. Instead, one can compute a single graph, each of whose vertices contains three separate colors and three separate sets of edges (one for each of R, X, and Y). In addition, there is no need to explicitly add the intermediate p, q and m vertices; rather, one can simply set a flag in memory for the appropriate edges such that they are treated as though the intermediate vertices were present.

While only the four constraints have been discussed, this technique can enforce any arbitrary constraint that involves a fixed, same, or different relation among the three orientation components R90, MX, and MY. In addition, the technique can easily be generalized to handle more general sets of orientations, as long as they can be uniquely described by a discrete set of independent operations.

In summary, the advantages of the present invention of a coloring algorithm over the known iterative algorithm are:

The coloring algorithm guarantees a valid solution. Since the iterative algorithm deals with same or mirrored orientation constraints rather arbitrarily, it is possible to devise systems of constraints for which the iterative algorithm is trapped into a situation where no valid solution can be found. One such system is described above.

The coloring algorithm is faster. The iterative algorithm has a time complexity $O((n+m)^2)$, where n is the number of objects and m is the number of constraints. The coloring algorithm has time complexity $O(c(n+m))$, where c is the number of overconstraints. Clearly $c \leq m$, so the time complexity of the coloring algorithm is at worst $O(nm+m^2)$, which improves on the iterative algorithm. Typically there are few overconstraints, in which case the time complexity of the coloring algorithm is closer to the case where there are no overconstraints, i.e. $O(n+m)$.

The coloring algorithm deals better with overconstraints. The iterative algorithm relaxes the particular constraint it is currently examining when an overconstraint is detected. The coloring algorithm, on the other hand, computes the entire set of constraints involved in the overconstraint so that intelligent decisions can be made about which of them should be relaxed to resolve the overconstraint.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A computer implemented, graph based method of determining the orientation of objects which can assume a plurality of orientations relative to a default orientation, including being rotated 90° clockwise, mirrored about an X axis, or mirrored about a Y axis, where the X axis and the Y axis are orthogonal to each other, and having a plurality of orientation constraints, including a fixed orientation constraint which requires an object to have one of eight predefined orientations, a same orientation constraint which requires that every object in a set of two or more objects must have the same orientation, a mirrored orientation constraint, which requires that a pair of objects have a mirrored orientation about the X axis or the Y axis, and a same or mirrored orientation constraint, which requires that every object in a set of two or more objects must have either the same orientation or the mirrored orientation, the method comprising the steps of:

(a) building R, X and Y interference graphs, corresponding to a 90° clockwise rotation operation, a mirror about the X axis operation, or a mirror about the Y axis operation, respectively, each of the R, X and Y interference graphs having a plurality of vertices and a plurality of edges, each object corresponding to one of the vertices in each of the R, X and Y interference graphs and each edge corresponding to a constraint between the objects represented by the vertices connected by the edge, two of the vertices being considered neighbors if connected by an edge, and with no neighbor vertices being allowed to have the same color;

(b) then placing an intermediate vertex between each pair of vertices in each of the R, X and Y graphs which represent a pair of objects having a same constraint limitation and connecting each intermediate vertex by an edge with each vertex of the pair of vertices;

(c) then placing an edge between each pair of vertices in one of the X graph or the Y graph which represent a pair of objects having a mirror constraint about either the X axis or the Y axis, respectively;

(d) then coloring each vertex of each pair of objects having a fixed orientation constraint to either a first color indicative that no operation is to be performed or a second color indicative that a respective one of the 90° clockwise rotation operation, the mirror about the X axis operation, or the mirror about the Y axis operation is to be performed, as may be required to implement the fixed orientation constraint relative to a default orientation and, if there are no vertices for objects having a fixed orientation, then coloring an arbitrary vertex as either the first color or the second color;

(e) beginning from a vertex colored in step 1(d), sequentially coloring all of the remaining vertices with either the first color or the second color subject to the condition that no neighbor vertices are to have the same color;

(f) for each colored vertex in the graphs R, X, and Y, not performing or performing on the object corresponding to that colored vertex, a 90° clockwise rotation operation, a mirror about the X axis operation, and a mirror about the Y axis operation, respectively, depending upon whether that vertex is the first color or the second color, respectively.

2. The computer implemented, graph based method of determining the orientation of objects according to claim 1, wherein in steps 1(d) and 1(e), a parent field is added to each vertex which contains the immediately previous vertex that was colored.

3. A computer implemented, graph based method of determining the orientation of objects according to claim 2, further comprising the steps, after performing step 1(e), of:

(e)(i) recognizing an overconstraint when, in any of the steps of coloring a vertex, there is an attempt to color neighbor vertices with the same color;

(e)(ii) upon recognition of an overconstraint, tracing connecting edges backward, using the parent field, from the vertex for which an overconstraint was recognized to either the first vertex found whose color was assigned in step 1(d) or, if no such vertex is found, to the vertex for which an overconstraint was recognized;

(e)(iii) forming a set of constraints which includes the recognized overconstraint and overconstraints corresponding to the edges which are traced;

(e)(iv) eliminating one of the constraints of the set of constraints; and (e)(v) repeating the graphing operation from the beginning.

4. In a computer automated design system for designing structures having objects which can assume a plurality of orientations relative to a default orientation, including being rotated 90° clockwise, mirrored about an X axis, or mirrored about a Y axis, where the X axis and the Y axis are orthogonal to each other, and having a plurality of orientation constraints, including a fixed orientation constraint which requires an object to have one of eight predefined orientations, a same orientation constraint which requires that every object in a set of two or more objects must have the same orientation, a mirrored orientation constraint, which requires that a pair of objects have a mirrored orientation about the X axis or the Y axis, and a same or mirrored orientation constraint, which requires that every object in a set of two or more objects must have either the same orientation or the mirrored orientation, a computer implemented graph based method for determining an orientation for each of the plurality of objects, the method comprising the steps of:

(a) creating three separate constraint graphs R, X and Y, representing a 90° clockwise rotation operation, a mirror about the X axis operation, and a mirror about the Y axis operation, respectively, each graph to consist of a collection of vertices, each vertex representing an object, and a collection of edges, each edge representing a constraint, where each edge is defined by separate vertices at its endpoints which are to be considered neighbors;

(b) in each of the R, X and Y graphs, introducing intermediate vertices between all pairs of vertices of objects subject to a constraint and edges between such intermediate vertices and each vertex of the pairs of vertices of objects subject to a constraint, except that:

(i) in the X graph or the Y graph corresponding to an axis about which there is a mirrored constraint, between vertices of pairs of objects subject to the mirrored constraint no intermediate vertices are to be introduced and an edge is to be added;

(ii) in the X graph or the Y graph corresponding to an axis about which there is a same or mirrored constraint, between vertices of pairs of objects subject to the same or mirrored constraint no intermediate vertices and no edges are to be introduced;

(c) coloring each vertex of each pair of objects having a fixed orientation constraint to either a first color indicative that no operation is to be performed or a second color indicative that a respective one of the 90° clockwise rotation operation, the mirror about the X axis operation, or the mirror about the Y axis operation is to be performed, as may be required to implement the fixed orientation constraint relative to a default orientation and, if there are no vertices for objects having a fixed orientation, then coloring an arbitrary vertex as either the first color or the second color;

(d) beginning from a vertex colored in step 4(c), sequentially coloring all of the remaining vertices with either the first color or the second color subject to the condition that no neighbor vertices are to have the same color;

(e) for each colored vertex in the graphs R, X, and Y, not performing or performing on the object corresponding to that colored vertex, a 90° clockwise rotation operation, a mirror about the X axis operation, and a mirror about the Y axis operation, respectively, depending upon whether that vertex is the first color or the second color, respectively.

5. A computer implemented, graph based method of determining the orientation of objects according to claim 4, further comprising the steps, after performing step 4(d), of:

(d)(i) recognizing an overconstraint when, in any of the steps of coloring a vertex, there is an attempt to color neighbor vertices with the same color;

(d)(ii) upon recognition of an overconstraint, tracing connecting edges backward, using the parent field, from the vertex for which an overconstraint was recognized to either the first vertex found whose color was assigned due to a fixed orientation constraint or, if no such vertex is found, to the vertex for which an overconstraint was recognized;

(d)(iii) forming a set of constraints which includes the recognized overconstraint and overconstraints corresponding to the edges which are traced;

(d)(iv) eliminating one of the constraints of the set of constraints; and (d)(v) repeating the graphing operation from the beginning.

6. In a computer automated design system for designing structures having objects which can assume a plurality of orientations relative to a default orientation, including being rotated 90° clockwise, mirrored about an X axis, or mirrored about a Y axis, where the X axis and the Y axis are orthogonal to each other, and having a plurality of orientation constraints, including a fixed orientation constraint which requires an object to have one of eight predefined orientations, a same orientation constraint which requires that every object in a set of two or more objects must have the same orientation, a mirrored orientation constraint, which requires that a pair of objects have a mirrored orientation about the X axis or the Y axis, and a same or mirrored orientation constraint, which requires that every object in a set of two or more objects must have either the same orientation or the mirrored orientation, a computer implemented graph based method for determining an orientation for each of the plurality of objects, the method comprising the steps of:

(a) creating three separate constraint graphs R, X and Y, representing a 90° clockwise rotation operation, a mirror about the X axis operation, and a mirror about the Y axis operation, respectively, each graph to consist of a collection of vertices, each vertex representing an object, and a collection of edges, each edge representing a constraint, where each edge is defined by separate vertices at its endpoints which are to be considered neighbors and with no neighbor vertices to have the same color;

(b) initially creating the graphs R, X and Y with no edges and leaving each vertex uncolored and thereafter:

(i) coloring each vertex of each object which is to have a fixed orientation constraint to either a first color indicative that no operation is to be performed or a second color indicative that a respective one of the 90° clockwise rotation operation, the mirror about the X axis operation, or the mirror about the Y axis operation is to be performed, as may be required to implement the fixed orientation constraint relative to a default orientation and, if there are no vertices for objects having a fixed orientation, then coloring an arbitrary vertex as either the first color or the second color;

(ii) after performing step 6(b)(i), implementing a same orientation constraint pairwise to every pair of objects in the constraint by adding intermediate vertices $p_R, p_X$, and $p_Y$ between each two vertices $u_R$, $v_R$; $u_X, v_X$; and $u_Y, v_Y$, respectively, of a given pair of objects in each of the R, X and Y graphs, respectively, for which there is a same orientation constraint and edges $(u_R, v_R)$, $(u_X, v_X)$ and $(u_Y, v_Y)$ to the R, X and Y graphs, respectively, thereby forcing the vertices $u_R$ and $v_R$ to be the same color, $u_X$ and $v_X$ to be the same color, and $u_Y$ and $v_Y$ to be the same color;

(iii) after performing either step 6(b)(i) or step 6(b)(ii), implementing a mirrored orientation constraint by adding intermediate vertices $p_R, p_X, p_Y$ between each two vertices $u_R, v_R$; $u_X, v_X$; and $u_Y, v_Y$ for objects which do not have a mirrored constraint, introducing no intermediate vertices between vertices for objects which have a mirrored constraint, adding edges between each intermediate vertex $p_R, p_X, p_Y$ and the vertices $u_R$, $v_R$; $u_X$, $v_X$; $u^Y$, $v_Y$, respectively, between which each vertex $p_R$, $p_X$ and $p_Y$ is intermediate, and coloring all of the remaining vertices such no neighbor vertices have the same color;

(iv) after performing step 6(b)(i), implementing a same or mirrored orientation constraint about a selected one of the X axis or the Y axis with respect to every pair of objects in the constraint by adding intermediate vertices $p_R$ between each two vertices $u_R$, $v_R$ for objects in the R graph and $p_X$, $p_Y$ between $u_X$, $v_X$ and $u_Y$, $v_Y$, respectively, in whichever of the X graph or the Y graph corresponds to the non-selected one of the X axis or the Y axis, i.e. the axis which does not have the constraint about it, adding edges between each intermediate vertex $p_R$, $p_X$, $p_Y$ and the vertices $u_R$, $v_R$; $u_X$, $v_X$; and $u_Y$, $v_Y$, respectively, between which each vertex $p_R$, $p_X$ and $p_Y$ is intermediate, introducing no intermediate vertices and edges between vertices for objects in the X graph or the Y graph corresponding to the selected one of the X axis or the Y axis, and coloring all of the remaining vertices such that no neighbor vertices have the same color;

c) for each colored vertex $u_R$, $v_R$; $u_X$, $v_X$; and $u_Y$, $v_Y$ in the graphs R, X, and Y, respectively, not performing or performing on the object corresponding to that colored vertex, a 90° clockwise rotation operation, a mirror about the X axis operation, and a mirror about the Y axis operation, respectively, depending upon whether that vertex is the first color or the second color, respectively.

7. A computer implemented, graph based method of determining the orientation of objects according to claim 6, further comprising the steps, after performing steps 6(b)(i)–(iv), of:

(b)(v) recognizing an overconstraint when, in any of the steps of coloring a vertex, there is an attempt to color neighbor vertices with the same color;

(b)(vi) upon recognition of an overconstraint, tracing connecting edges backward, using the parent field, from the vertex for which an overconstraint was recognized to either the first vertex found whose color was assigned due to a fixed orientation constraint or, if no such vertex is found, to the vertex for which an overconstraint was recognized;

(b)(vii) forming a set of constraints which includes the recognized overconstraint and overconstraints corresponding to the edges which are traced;

(b)(viii) eliminating one of the constraints of the set of constraints; and (b)(ix) repeating the graphing operation from the beginning.

* * * * *